US007370327B2

(12) United States Patent
Trotter

(10) Patent No.: US 7,370,327 B2
(45) Date of Patent: May 6, 2008

(54) METHOD FOR MANAGING MEMORY RESOURCES IN A SHARED MEMORY SYSTEM

(75) Inventor: Martin John Trotter, Ampfield (GB)

(73) Assignee: International Business Machines Corporation, Armonk, NY (US)

( * ) Notice: Subject to any disclaimer, the term of this patent is extended or adjusted under 35 U.S.C. 154(b) by 1018 days.

(21) Appl. No.: 10/383,302

(22) Filed: Mar. 6, 2003

(65) Prior Publication Data
US 2004/0123303 A1 Jun. 24, 2004

(30) Foreign Application Priority Data
Dec. 19, 2002 (GB) .................................. 0229670.5

(51) Int. Cl.
G06F 9/50 (2006.01)
G06F 12/00 (2006.01)
(52) U.S. Cl. .............. 718/104; 707/103 Z; 707/103 R; 711/170; 711/154; 709/227
(58) Field of Classification Search ............ 718/1–108; 711/170, 154; 709/227; 707/103 R, 103 Y, 707/205–206, 103 Z
See application file for complete search history.

(56) References Cited

U.S. PATENT DOCUMENTS

| 6,430,570 | B1 * | 8/2002 | Judge et al. ............. 707/103 R |
| 6,502,111 | B1 * | 12/2002 | Dussud ....................... 707/206 |
| 6,564,223 | B1 * | 5/2003 | Sexton et al. ........... 707/103 Y |
| 6,604,182 | B1 * | 8/2003 | Sexton et al. ................ 711/170 |
| 6,807,551 | B2 * | 10/2004 | Sayag ......................... 707/206 |
| 6,865,585 | B1 * | 3/2005 | Dussud ....................... 707/206 |
| 6,938,254 | B1 * | 8/2005 | Mathur et al. .............. 718/104 |
| 7,028,298 | B1 * | 4/2006 | Foote .......................... 718/104 |
| 7,086,060 | B2 * | 8/2006 | Hahn .......................... 718/104 |
| 7,162,605 | B2 * | 1/2007 | Achanta et al. ............. 711/170 |
| 2003/0187989 | A1 * | 10/2003 | Petit ............................ 709/227 |
| 2004/0024798 | A1 * | 2/2004 | Chauvel ...................... 707/206 |
| 2004/0111725 | A1 * | 6/2004 | Srinivasan et al. .......... 718/105 |

OTHER PUBLICATIONS

U.S. Appl. No. 60/400,391, "JSM Protection", filed Jul. 31, 2002.*

* cited by examiner

Primary Examiner—Lewis A. Bullock, Jr.
(74) Attorney, Agent, or Firm—DeLizio Gilliam, PLLC

(57) ABSTRACT

A method is provided for managing memory resources in a shared memory system. A point is identified (10) at which memory usage will be constrained. An object pertaining to an active user of the system is identified (20), and further objects related to this object are also found (30). A user memory footprint is then determined (40) from the footprints of the identified objects. Different constraint options are identified (50) and one of these is used to constrain (60) the user memory footprint. In this way the memory used by individual users may be tracked and constrained without having to place all the work from users into separate JVMs. Therefore the 'bursty' nature of memory consumption by multiple users can be summed to result in a JVM which exhibits much less bursty memory requirements and allows individual users to have relatively relaxed constraints.

10 Claims, 2 Drawing Sheets

METHOD FOR MANAGING MEMORY RESOURCES IN A SHARED MEMORY SYSTEM

TECHNICAL FIELD OF THE INVENTION

This invention relates to shared memory systems and particularly (though not exclusively) to shared usage of a JVM (Java Virtual Machine) by many remote users. "JAVA" is a trademark of Sun Microsystems Inc.

BACKGROUND OF THE INVENTION

In the field of this invention it is known that in a JVM shared by many remote users, any one of the users could individually exhaust all the memory available to the JVM. The JVM itself imposes limits on the memory usage by all users of that JVM. These limits are imposed by specifying a maximum heap size limit.

A 'garbage collector' analyses the live memory within the heap by starting from a set of root references on the stacks (in global references such as class statics) and by proceeding to mark all objects thus referenced.

However, this approach has the disadvantage(s) that the single JVM limit constrains all the potential users of a multi-user JVM to the same level and makes it possible for one user to mount a denial of service attack simply by over-consuming memory.

The techniques used by garbage collection to mark the live memory are effective but are not sufficient to identify the objects created by a given user and thus determine which user or users are over-consuming memory.

One possible solution to this problem would be to define the concept of an 'Isolate' which can be given some set of resources and allowed to consume them until it fails. If the isolate is implemented as a separate JVM then the scale of any resultant damage can be obviously limited.

However, defining multiple 'isolates' would lead to poor utilisation of resources since each isolate must be allowed to grow individually to the resource limits.

A need therefore exists for a method and system for managing memory resources in a shared memory system (such as a JVM) wherein the abovementioned disadvantage(s) may be alleviated.

SUMMARY OF THE INVENTION

In accordance with a first aspect of the present invention there is provided a method for managing memory resources in a shared memory system having a plurality of users and having a total memory footprint, the method comprising: determining that the total memory footprint of the system has reached a predetermined level; identifying at least one object pertaining to a user of the system; and determining a user memory footprint by calculating the memory footprint of the at least one object, and constraining the user memory footprint such that the total memory footprint of the system is limited.

In accordance with a second aspect of the present invention there is provided a system for imposing memory constraints on a user of a shared memory system, according to the first aspect.

According to a third aspect, the invention provides a computer program product for, when run on a computer system, instructing the computer system to carry out the method of the first aspect.

Preferably, identifying at least one object comprises identifying a principal object and identifying at least one further object related to the principal object. The principal object and the at least one further object preferably represent substantially all objects relating to the user.

The system preferably comprises a Java Virtual Machine. Preferably identifying the at least one further object comprises performing a recursive marking operation which stops at one of: an object which is already known; an object identified as a global object; and a class which is inherited by the user.

Constraining the user memory footprint preferably includes terminating incoming sessions from the user. Alternatively, constraining the user memory footprint preferably includes stopping threads running on behalf of the user.

The size of individual objects allocated to the user is preferably limited.

In this way the memory used by individual users may be tracked and constrained without having to place all the work from individual users into separate JVMs. Therefore, the 'bursty' nature of memory consumption by multiple users can be summed to result in a JVM which exhibits much less bursty memory requirements whilst at the same time allowing individual users to have relatively relaxed constraints.

BRIEF DESCRIPTION OF THE DRAWINGS

One system and method for managing memory resources in a shared memory system incorporating the present invention will now be described, by way of example only, with reference to the accompanying drawings, in which.

DETAILED DESCRIPTION OF THE PREFERRED EMBODIMENTS

Figure 1:
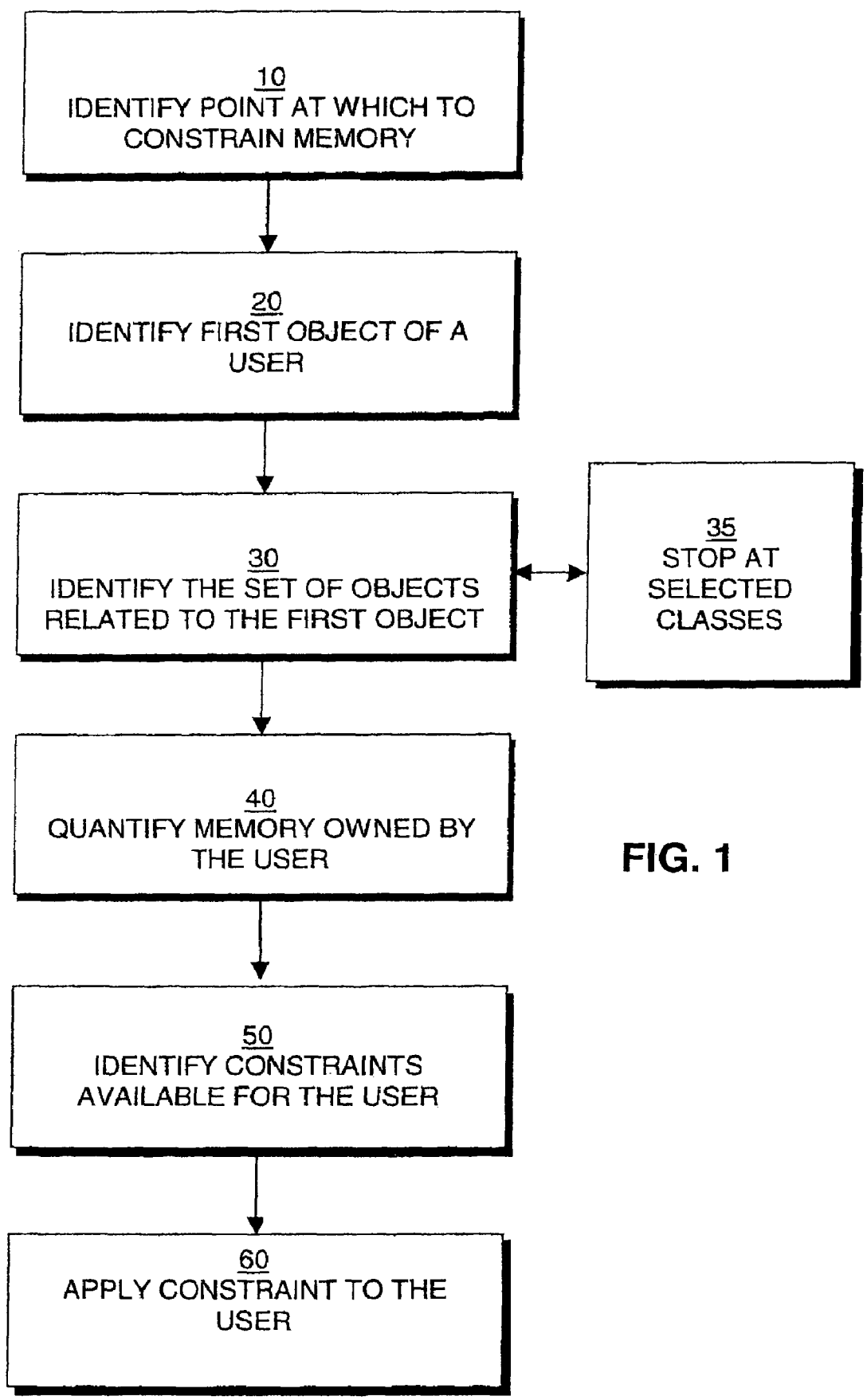
FIG. 1 shows a block schematic diagram illustrating steps of a method for memory allocation in a shared memory system incorporating the present invention.

Referring to FIG. 1, there is shown an illustrative flow chart of the steps involved in limiting memory consumed by a given user. These steps are implemented in a software environment (hereafter referred to as a 'container').

At box 10, the identification of the point at which to constrain memory is performed. The ideal point is just prior to a heap growth event but this is not easy to implement in practice.

Three possible methods for achieving the function of box 10 are described below.

The first involves periodically sampling the value of Runtime.totalMemory() and imposing the constraint when it reaches a pre-determined value.

The second involves creating a WeakReference which will be queued after a garbage collection cycle in which the heap was expanded.

The third alternative is to employ a monitoring event from JVMPI (JVM Performance Interface) or the newly proposed tools interface (JVMTI) to provide an indication that the garbage collector has just done something.

The monitoring event would ideally be a 'heap growth' event but in the worst case the simple 'garbage collection' event would suffice.

When that event is generated, Runtime.totalMemory and Runtime.freeMemory would be sampled in order to determine if the JVM is approaching a point at which further analysis of memory usage should be undertaken.

In this way, when it becomes necessary to constrain memory, the next step 20 is performed, namely the identification of a first or principal object pertaining to the currently executing user. This is performed using well known techniques. In essence there will exist a set of principal objects representing individual users. These principal objects facilitate the location of all session objects representing active connections which the user may have and also objects representing any active threads which the user has been allowed to create.

Typically it is preferable that users do not create threads but that their processing requirements are met using message receive methods of session or conversation objects.

In box 30, a reflection procedure is invoked to find the closure of objects referenced from that principal object.

At the first level this will be the set of session objects which represent the connections through which the user is driving work into the JVM. During the identification of this set of objects it is necessary to verify that any one identified object:

A) has not already been identified as part of the set;

B) has not been assigned to public or other fields in classes which are not directly owned by the user; and, C) is not an instance of one of the container implementation classes, possibly the container itself.

These exceptions are illustrated by box 35. If any of the above conditions are true, the object must be omitted from the set.

Case A) above is relatively easy to prevent by maintaining a record of previously identified set members.

Case C) is handled by abandoning the trace at that point once this situation has been detected.

For Case B), the preferred technique is to leave untraced any Container implementation classes which the user is intended to extend as part of the user's implementation and which may contain references to objects not primarily associated with the user. In addition the well known classfile modification techniques would be employed to prevent the user assigning objects which are personal to the user into static fields of Container or J2SE (Java 2 Standard Edition) classes and thus 'hiding' such data from this tracing step.

Figure 2:
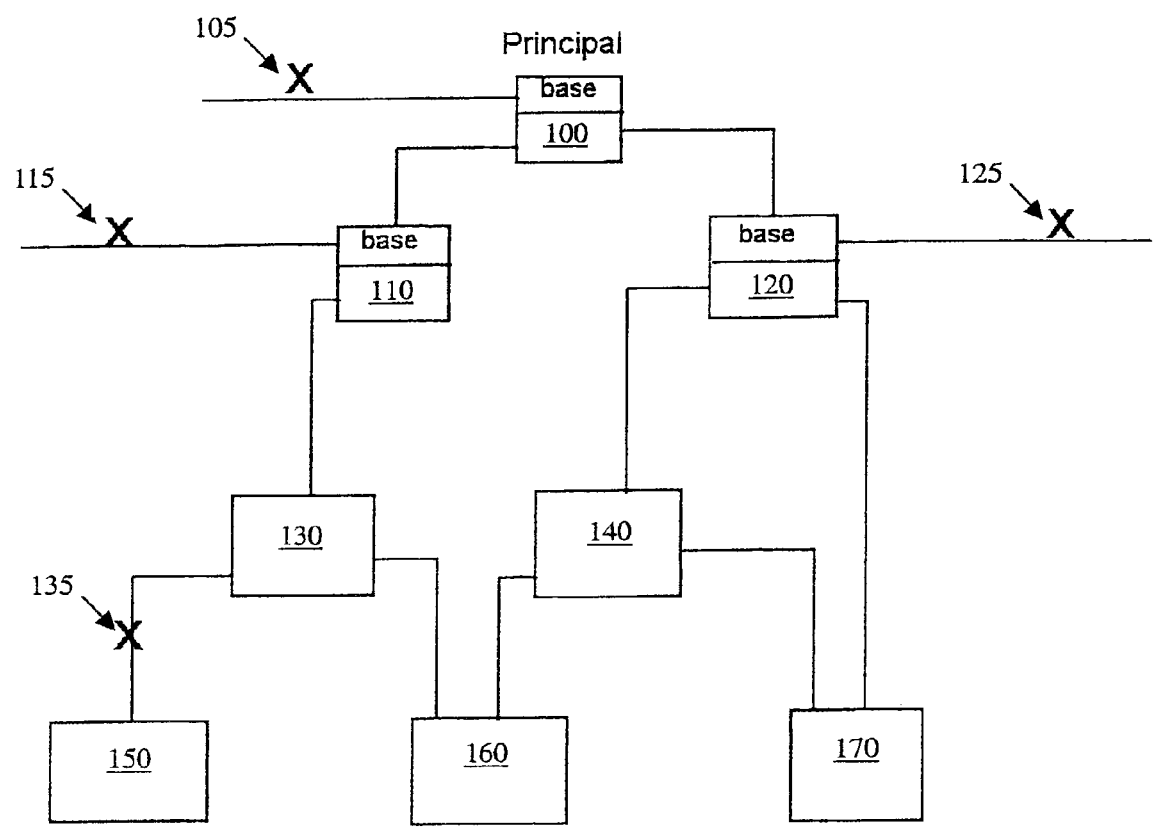
FIG. 2 shows an illustrative block diagram showing objects identified by the method of FIG. 1.

Referring now also to FIG. 2, there is shown an illustrative block diagram showing a number of objects relating to a user.

A principal object 100 which has a base class inheritance represents the user. 'X' 105 is an untraced reference from the base class field of the object 100. This is because references from the base class fields are not traced.

Objects 110 and 120 also have base class inheritances, and these are found from tracing the non-base class references of the principal object 100. 'X's 115 and 125 respectively are untraced references from the base class fields of the objects 110 and 120 respectively.

Objects 130 and 140 are objects traced via the non-base class references of objects 110 and 120 respectively. Object 150 is a global object and is therefore untraced (shown by 'X' 135).

Objects 160 and 170 are multiply traced, object 160 being referenced by objects 130 and 140 respectively, and object 170 being referenced by objects 120 and 140 respectively. This is why it is important for a record to be kept of traced objects, so that no object is counted more than once.

By the above means each of the objects relating to the user are identified, and referring again to FIG. 1, at box 40, the sum of the memory owned (used) by the user is quantified from these identified objects.

At box 50, the imposition of resource limits is then selected. The memory usage by the user may be constrained either by terminating incoming sessions from the user or stopping threads running on behalf of the user.

Finally, at box 60, the selected constraint is applied to the user.

There are two further problems to handle: threads which may be associated with the user and requests for large amounts of memory.

If a user requests a large piece of memory then the above checks may not help. The memory subsystem will be handed the request (for example, for a huge array of long bytes with 2**31 elements).

It will attempt to run a garbage collection event but in general the task will fail and it will be forced to give up with an OutOfMemoryError which will be potentially caught by the user code and retried leading to a tight CPU consuming loop; in other words a denial of service opportunity. To avoid this situation it is assumed that the JVM will itself be able to impose limits on the size of large objects allocated by the current thread.

This limit will be defined by putting a new method setObjectSizeLimit (long bytes) on a thread sub-class which will prevent the creation of large objects which would otherwise cause this problem. It would also be possible to have the JVM impose some arbitrary limit on all threads in this environment. At the very least a user must be prevented from turning this situation into a way to consume endless CPU catching out of memory errors and thus mounting a denial of service attack.

If threads are permitted to be associated with a user then the above checks will not suffice since the user can simply define some local variables in the thread and reference any amount of memory from them. In this situation a way must be found to either trace these local variables or to make these threads leave their run method during the tracing. The first option will imply the introduction of another new method on the thread sub-class, such as:

int findLocalReferences(Object[] refs);

Such a method would suffice and would be a native method. Obviously that technique requires some involvement from the JVM and is thus not appropriate for a class which will be used with a standard J2SE implementation.

A second option is to impose some limit on the length of time a run method can execute. Any thread which fails to complete within that limit could simply be stopped using Thread.stop. Typically all the users threads would be stopped if any of them caused such a problem.

Also it would need to be ensured that threads are not stopped whilst in the process of making updates to shared resources. This model would effectively force the user to break the work into small pieces and pass it from thread to thread until completion. If this method is chosen then it could be optimised for use within the JVM by maintaining a thread pool and using it to drive the successive run methods. The user's work can be stopped at any point by simply avoiding calling the run methods of the user's thread objects until after the memory scan is complete. This whole approach makes no change to standard Java syntax but obviously changes the semantics of the run method to include the statement 'must not run for more than X ms'. It is worth noting that, providing the threads are fairly well behaved and don't consume large amounts of memory, the JVM heap will stay below some threshold value and none of the checking mentioned so far will be done.

Hence for well behaved users the overhead will be zero. The likely outcome is that badly behaved code or users will be quickly identified and prevented from running at all. The intent of all this work is to find a way to identify such 'rogues' and a way to deal with them once found.

In this way substantially all of the extant objects created by a given user are identified, and a limit is placed both on the number of objects and on the total size. The result will define something akin to a 'flexible isolate' in that there will be no need to decide once and for all what the resource limits for a given isolate should be; they can be varied during the lifetime of the JVM as policies change.

It will be understood that the embodiment described above provides the following advantages:

The memory used by individual users can be tracked and constrained without having to place all the work from individual users into separate JVMs. The net effect is that the 'bursty' nature of memory consumption by multiple users can be summed to result in a JVM which exhibits much less bursty memory requirements while at the same time allowing individual users to have relatively relaxed constraints.

It will be appreciated by a person skilled in the art that alternative embodiments to those described above are possible.

For example the embodiment above relates to a JVM, but other embodiments suitable for other shared memory systems are contemplated, in which objects and processes associated with those systems would be utilised instead of the JVM objects and processes described above.

What is claimed is:

1. A method for managing memory resources in a shared memory system having a plurality of users and having a total memory footprint, the method comprising:
   determining that the total memory footprint of the system has reached a predetermined level;
   identifying at least one object pertaining to a user of the plurality of users of the system;
   determining a user memory footprint by calculating the memory footprint of the at least one object, wherein the user memory footprint is a memory footprint of the user in the shared memory system; and
   constraining the user memory footprint such that the total memory footprint of the system is limited,
   wherein the identifying at least one object comprises identifying a principal object and identifying at least one further object related to the principal object,
   wherein identifying the at least one further object comprises performing a recursive marking operation which stops at one of:
   an object which is already known;
   an object identified as a global object; and
   a class which is inherited by the user.

2. The method of claim 1 wherein the principal object and the at least one further object represent substantially all objects relating to the user.

3. The method of claim 1 wherein constraining the user memory footprint includes terminating incoming sessions from the user.

4. The method of claim 1 wherein constraining the user memory footprint includes stopping threads running on behalf of the user.

5. The method of claim 1 further comprising limiting the size of individual objects allocated to the user.

6. The method of claim 1 further comprising constraining space of the shared memory allocated for creation of a new object for the executing user to a given limit.

7. A method for managing memory shared among a plurality of users, the method comprising:
   detecting a monitoring event that indicates use of the shared memory by an executing one of the plurality of users should be analyzed;
   identifying a principal object that represents the executing user;
   identifying a set of objects related to the identified principal object, wherein the set of objects represent at least one of an active connection of the executing user and an active thread of the executing user;
   quantifying with the identified principal object and the identified set of objects an amount of the shared memory owned by the executing user; and
   constraining use of the shared memory by the executing user based on the quantified amount of the shared memory owned by the executing user.

8. The method of claim 7 wherein the monitoring event comprises one of a garbage collection event and a heap growth event.

9. The method of claim 7 wherein the identifying the set of objects comprises selecting an object referenced by the identified principal object to be identified as one of the set of objects as long as the selected object is not already identified as one of the set of objects, is not an instance of a container implementation class, is not assigned to a public held, and is not assigned to a field of a class that is not directly owned by the executing user.

10. The method of claim 7 wherein the constraining the use of the shared memory comprises at least one of stopping a thread running on behalf of the executing user and terminating an incoming session from the executing user.

* * * * *